United States Patent
Morohashi et al.

(10) Patent No.: US 6,974,279 B2
(45) Date of Patent: Dec. 13, 2005

(54) EJECTOR, FINE SOLID PIECE RECOVERY APPARATUS AND FLUID CONVEYOR

(75) Inventors: Yasuo Morohashi, Aichi (JP); Hidetoshi Omori, Aichi (JP); Toshihiro Naruse, Aichi (JP)

(73) Assignee: Trinity Inudstrial Corporation, Aichi (JP)

(*) Notice: Subject to any disclaimer, the term of this patent is extended or adjusted under 35 U.S.C. 154(b) by 83 days.

(21) Appl. No.: 10/679,352

(22) Filed: Oct. 7, 2003

(65) Prior Publication Data

US 2005/0074303 A1 Apr. 7, 2005

(51) Int. Cl.[7] .............................................. B65G 53/60
(52) U.S. Cl. ........................ 406/173; 406/92; 406/86; 406/194
(58) Field of Search ........................... 406/86, 92, 173, 406/194, 195

(56) References Cited

U.S. PATENT DOCUMENTS

| | | | |
|---|---|---|---|
| 2,751,257 A * | 6/1956 | Peterson et al. | 406/14 |
| 2,982,082 A * | 5/1961 | Pool | 28/272 |
| 3,774,846 A * | 11/1973 | Schurig et al. | 239/427.3 |
| 4,010,551 A * | 3/1977 | Rohde | 34/576 |
| 4,724,272 A * | 2/1988 | Raniere et al. | 585/500 |
| 5,769,572 A * | 6/1998 | Pfeiffer | 406/153 |
| 6,283,833 B1 * | 9/2001 | Pao et al. | 451/40 |
| 6,523,991 B1 * | 2/2003 | Maklad | 366/163.2 |

FOREIGN PATENT DOCUMENTS

JP 2002-356224 12/2002

* cited by examiner

Primary Examiner—Joe Dillon, Jr.
(74) Attorney, Agent, or Firm—Greenblum & Bernstein, P.L.C.

(57) ABSTRACT

An ejector is configured to generate a high negative pressure capable of sucking and conveying fine metal pieces or chips, such as machinings or cuttings, for example, when using the ejector as a driving source for a fluid conveyor. The ejector includes a convergent-divergent nozzle having a throat formed between a suction port and a discharge port. Jet blowing holes are formed in the convergent-divergent nozzle to direct a jet stream from upstream of the throat to downstream of the throat, thereby forming a negative pressure. Pressure control holes open to the downstream of the jet blowing holes and are configured to communicate with a pressure space at a pressure level higher than a negative pressure formed by the jet stream and lower than a static pressure of the jet stream and the inside of the convergent-divergent nozzle.

10 Claims, 3 Drawing Sheets

EJECTOR, FINE SOLID PIECE RECOVERY APPARATUS AND FLUID CONVEYOR

BACKGROUND OF THE INVENTION

1. Field of the Invention

Figure 1:
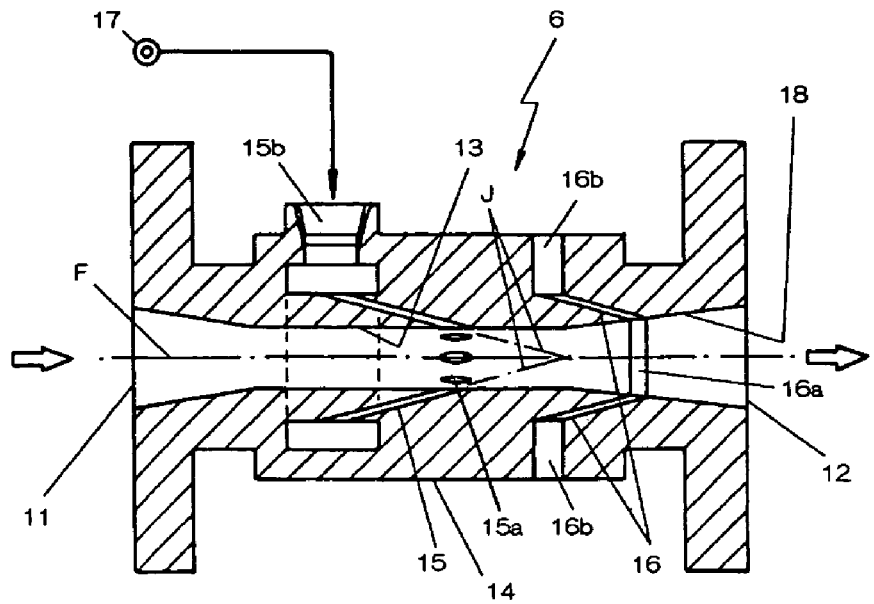

The present invention concerns an ejector for sucking a fluid by utilizing a negative pressure formed by the involving effect of a jet stream jetted at a high speed, a fine solids recovery apparatus using the ejector and a fluid conveyor.

2. Statement Related Art

In recent years, numerical control (NC) systems have been progressed in machine tools for cutting or machining metal works and most of processes from setting of works and machine tools to the completion of the cutting or machining operation have been conducted automatically.

In this case, since a great amount of cuttings (e.g., a lot of machining chips) are discharged, if left as they are, they not only hinder the cutting or machining operation but also twine around the works or tools under rotation, to injure the works or scatter the cuttings to the surroundings (or the machining chips around the machine).

In view of the above, it has been adopted, upon cutting or machining works, a method of flowing cuttings or machining chips together with lubricants and cutting oils (e.g., coolant) used as cooling liquids into buckets located below machine tools or the machine, recovering the cuttings or the machining chips in the stream of the cutting oils (e.g., coolant) recovered from the buckets by way of waste oil flow channels or flumes (troughs) and then separating the cutting oils (e.g., coolant) and the cuttings or machining chips by solid/liquid separation.

The recovered cutting oils (e.g., coolant) are circulated and re-utilized but they have to be disposed finally as industrial wastes which is not desirable in view of environmental protection. Then, dry process of conducting the cutting or machining operation by using super hard bites with no use of cutting oils (e.g., coolant) has become predominant in recent years.

In this case, generally, the cuttings or machining chips are at first blown out by an air stream jetted out from an air nozzle (e.g., a compressed air stream) disposed near the tool and dropped into a bucket located below a machine tool or machine, and then cuttings or machining chips are conveyed to a predetermined place for recovery in a plant by way of a conveying channel or route comprising a plurality of belt conveyors connected to each other.

However, since individual belt conveyors constitutes each a linear conveying path, when a plurality of belt conveyors are connected, the conveying paths are formed in a polygonal line which makes a free layout difficult and increases the installation cost, as well as gives rise to a problem of increasing the running cost since individual conveyors require driving motors respectively.

Further, it also involves a problem of tending to cause failure when fine cuttings or chips and the likes clog the mechanical driving portion of the belt conveyor.

When a pneumatic conveyor is used instead of the belt conveyor and cuttings or machining chips are sucked like in a vacuum cleaner and then conveyed on an air stream, since the conveying path itself is a pipe, it can be arranged in a free layout. However, when a mechanical vacuum pump is used as a driving source for the pneumatic conveyor, it also requires increased installation cost and running cost and there is also a worry that cuttings or fine chips clog the vacuum pump.

Then, when an ejector is used instead of the vacuum pump, the installation cost is decreased, both of the driving source and the conveying path are free from the provision of mechanical driving portions at all, and high pressure or compressed air referred to as "plant air" supplied from pipelines in the plant may be used as the energy therefor, so that the running cost can also be decreased.

However, since the ejector has an extremely low negative pressure compared with the reciprocal, rotational or centrifugal mechanical vacuum pump, although it may be used as a driving source for a pneumatic conveyor that conveys light-weight material such as powder, it can not be practical as a driving source for a pneumatic conveyor that conveys fine metal pieces such as cuttings or machining chips.

Further, the ejector is used also as a driving source for a fluid conveyor that jets out a liquid such as water to form a jet stream, sucks the fluid of a similar type by the negative pressure and conveys burnt ashes such as clinker entrained on the fluid flow. In this case, if a higher negative pressure can be obtained, the suction amount can be increased to improve the conveying efficiency by so much, can serve to energy saving and also decrease the running cost.

In view of the above, if an ejector is used, for example, as a driving source for a fluid conveyor, etc., the present invention is configured to increase the negative pressure and increase the ejector power, by improving the conveying efficiency, serving to energy saving and also reducing the running cost.

SUMMARY OF THE INVENTION

The foregoing subject can be attained by an ejector, in accordance with the first feature of the present invention, comprising a convergent-divergent nozzle having a throat formed between a suction port and a discharge port, in which jet blowing holes for jetting a jet stream from the upstream to the downstream of the throat thereby forming a negative pressure are formed in the convergent-divergent nozzle, wherein pressure control holes are formed and opened to the downstream of the jet blowing holes for communicating a pressure space at a level higher than the negative pressure formed by the jet stream and lower than the static pressure of the jet stream and the inside of the convergent-divergent nozzle.

When the jet stream is jetted from the jet blowing holes, a fluid is sucked by the negative pressure from the suction port and discharged at a high pressure from the discharge port.

According to the experiment made by the inventors, the flow speed of a fluid sucked from the suction port reaches a high speed at the junction point with a jet stream, but the distance of the high speed region is short in a case where pressure control holes are not present. On the contrary, when the pressure control holes are formed as in the feature of the present invention, it has been confirmed that the distance of the high speed region is made longer and, as a result, the flow speed and the flow rate of the fluid sucked from the suction port are increased.

In a case of jetting air as a jet stream, sucking air through the suction port, the negative pressure of the ejector was $-0.06$ kg/cm$^2$ in a case where the pressure control holes are not formed, whereas the negative pressure was increased by about five times, that is, to $-0.3$ kg/cm$^2$ by forming the pressure control holes.

Further, also in a case of jetting water as the jetting stream and sucking water from the suction port, the negative pressure was $-0.25$ kg/cm$^2$ in an ejector formed with the pressure control holes, whereas the negative pressure was increased by about three times, that is, −0.8 kg/cm² by provision of the pressure control holes.

Generally, when a jet stream is jetted into a convergent-divergent nozzle, a dynamic pressure (negative pressure) that involves (sucks) a fluid from the suction port to form a suction stream and a static pressure that tends to inhibit the flow of the suction stream exert, and the suction stream is formed with no provision of the pressure control holes since the dynamic pressure is sufficiently higher than the static pressure. It is considered that since the pressure control holes in communication with the pressure space at a level lower than the static pressure of the jet stream are formed in the present invention, the static pressure component tending to inhibit the suction stream is caused to escape by the pressure control holes, which increases the negative pressure of the ejector and increase the ejector power.

Further, since the pressure in the pressure space in communication by way of the pressure control holes is higher than the negative pressure formed by the jet stream, while an external fluid may flow into the ejector through the pressure control holes, the fluid flowing in the ejector does not leak through the pressure control holes to the outside.

In the second feature of the present invention, the jet blowing holes and the pressure control holes are formed being opened to the inner circumferential surface of the convergent-divergent nozzle along the circumferential direction in the shape of a ring or at a predetermined distance, so that the pressure distribution is less deviated and a uniform flow speed distribution can be obtained with respect to the center of the convergent-divergent nozzle as an axis of symmetry.

In accordance with a third feature of the present invention, the pressure control holes are in communication with atmospheric air.

Since the atmospheric pressure is higher than the negative pressure formed by the jet stream, when the inside and the outside of the convergent-divergent nozzle are in communication by way of the pressure control holes, while the external air may be sucked into the ejector, the fluid flowing in the ejector does not leak through the pressure control holes to the outside.

Further, since the atmospheric pressure is lower than the static pressure of the jet stream, the static pressure can be caused to escape and, accordingly, the negative pressure of the ejector is increased to increase the ejector power.

In accordance with a fourth feature of the present invention, discharge holes for a control fluid that forces the jet stream discharged from the jet blowing holes to the center of the convergent-divergent nozzle are formed between the jet blowing holes and the pressure control holes, and the jetting angle thereof is chosen to an acute angle relative to the stream line from the suction port to the discharge port, the angle being larger than the jetting angle of the jet blowing hole.

In a case where the inner diameter of the convergent-divergent nozzle was increased and the pressure of the jet stream supplied was increased intending to increase the flow rate of the suction stream, the negative pressure could not be increased as expected. Then, the fourth feature of the invention has been made in order to improve this difficulty.

That is, when the flow in the ejector formed with the pressure control holes to the convergent-divergent nozzle of a relatively large diameter was analyzed, it was found that the stream line of the jet stream jetted toward the center was flexed so as to be along the pipe wall under the effect of the suction stream and the high speed region H was not formed at the center of the convergent-divergent nozzle.

In view of the above, the controlling fluid discharge holes are provided so as to force the jet stream by the controlling fluid to the center of the convergent-divergent nozzle in the fourth feature of the present invention.

With the feature described above, even in a case of using a convergent-divergent nozzle of a relatively large inner diameter, since the jet stream can be forced to the center of the convergent-divergent nozzle to form a high speed region at the center, the flow speed and the flow rate of the suction stream can be increased to increase the negative pressure of the ejector and increase the ejector power.

The fifth feature of the invention provides a fine solids recovery apparatus of conveying and recovering sucked fine solids by a pneumatic conveyor in which the ejector according to the first feature is used as a driving source for the pneumatic conveyor and fine solids are recovered by a cyclone separator.

In accordance with the fifth feature of the present invention, since the negative pressure of the ejector is high, the conveying air stream formed with the negative pressure of the ejector can suck even fine solids such as relatively heavy metal cuttings or machining chips and, when they are caused to flow into the cyclone separator, the energy of the stream forms a swirling stream in the cylindrical separation column in which air gathered to the center is exhausted to the outside, and the fine solids are collided against the circumferential wall centrifugally and dropped, and sucked fine solids can be recovered easily.

According to a sixth feature of the present invention, since an ejector of high negative pressure is used as a driving source for a fluid conveyor, even a liquid of high specific weight such as burnt ashes or sludge-like liquid wastes can also be conveyed reliably.

DESCRIPTION OF THE ACCOMPANYING DRAWINGS

Figure 2:
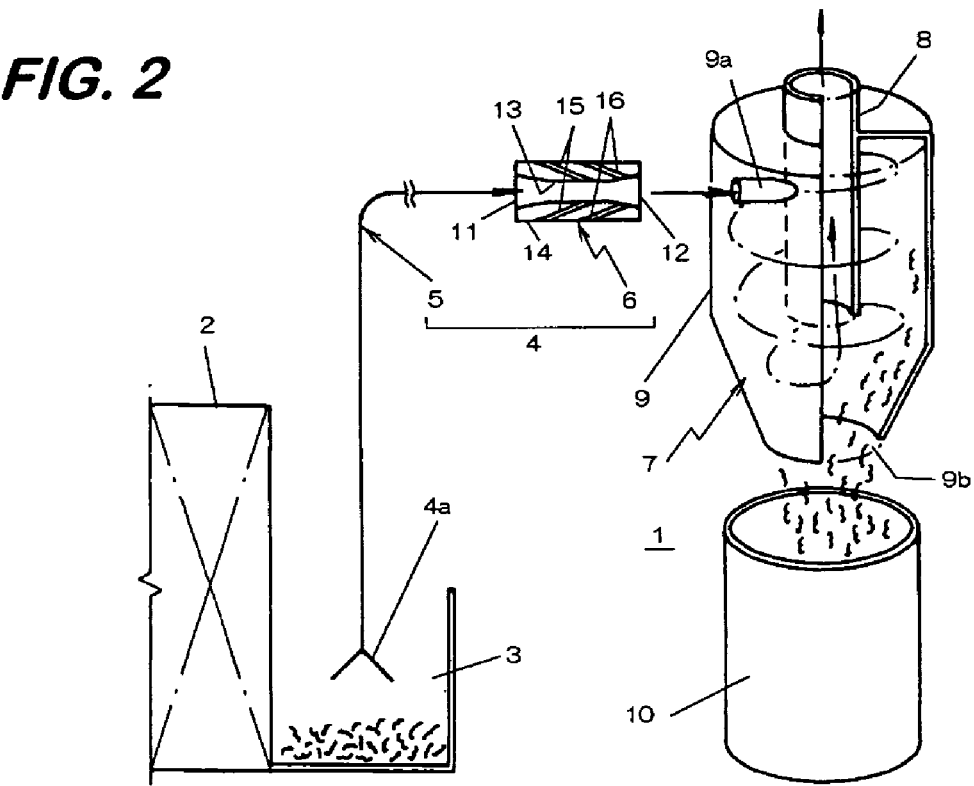
Figure 3A:
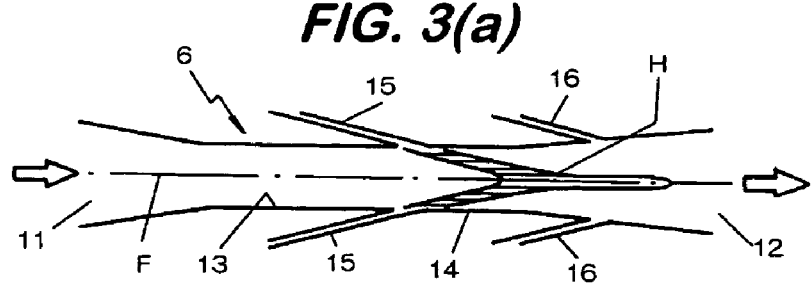
Figure 3B:
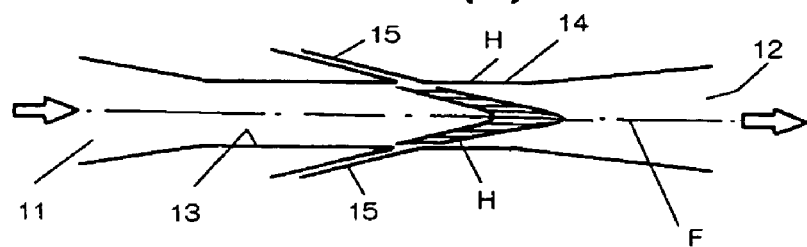
Figure 4:
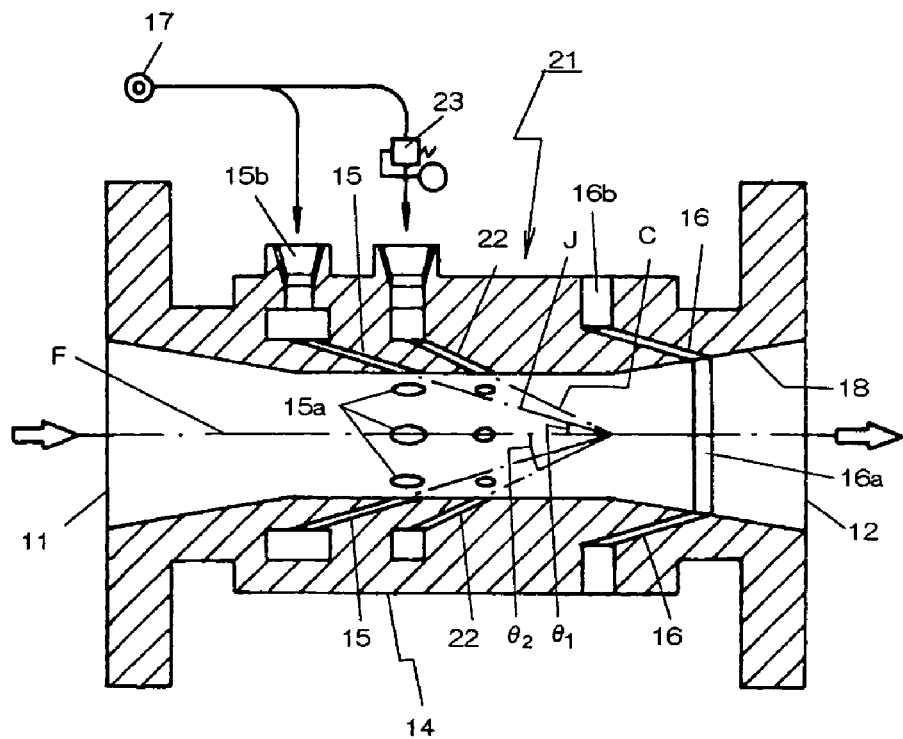
Figure 5A:
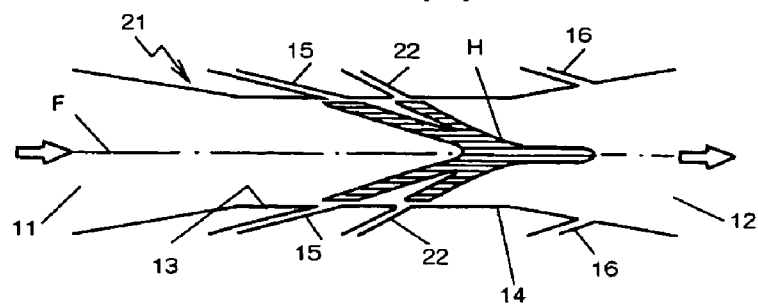
Figure 5B:
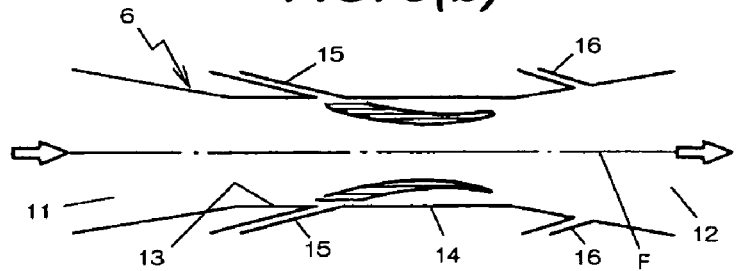
Figure 6:
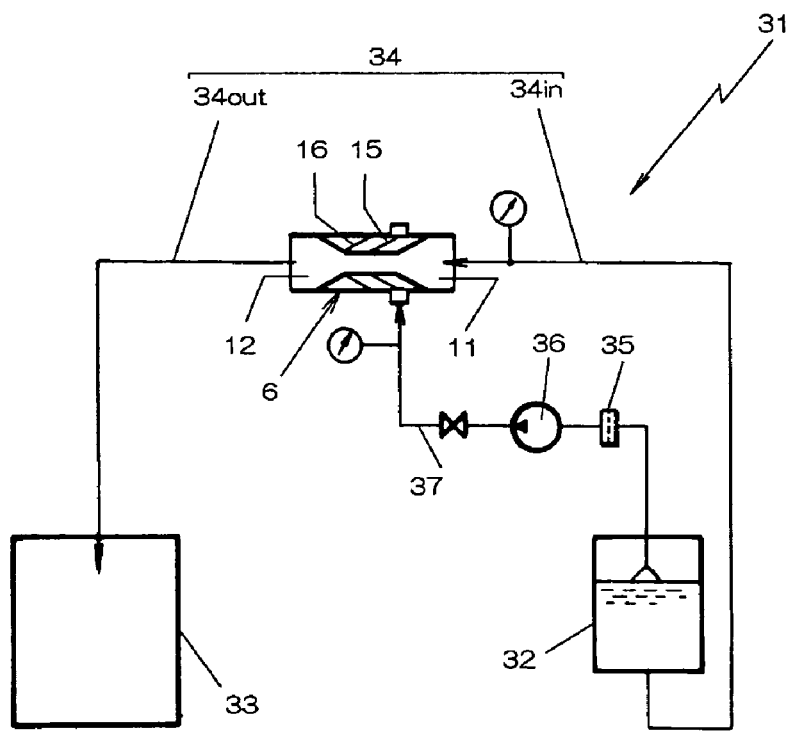

Preferred embodiments of this invention will be described in details based on the drawings, wherein FIG. 1 is an explanatory view showing an ejector according to the present invention;

FIG. 2 is a schematic explanatory view showing a fine solids recovery apparatus according to the present invention;

FIGS. 3(a) and 3(b) are simulation charts for analyzing the flow in the ejector thereof;

FIG. 4 is an explanatory view showing another embodiment of the present invention;

FIGS. 5(a) and 5(b) show simulation charts for analyzing the flow in the ejector thereof; and FIG. 6 is an explanatory view showing a fluid conveyor utilizing an ejector as a driving source.

DESCRIPTION OF PREFERRED EMBODIMENTS

The present invention is to be described specifically by way of its preferred embodiments with reference to the drawings.

In fine solid recovery apparatus 1 according to the present invention, as shown in FIG. 2, metal cuttings or machining chips (fine solids) sucked from a bucket 3 provided to a machine tool 2 are conveyed by a pneumatic conveyor 4 and then recovered.

In a conveying pipeline 5 for the pneumatic conveyor 4, an ejector 6 forming a conveying air stream is intervened in which one line end is formed as a suction end 4a and the other line end as a discharge end 4b is connected to a cyclone separator 7.

The cyclone separator 7 has a hopper-type cylindrical separation column 9 having an exhaust cylinder or duct 8 formed at the center. The cylindrical separation column 9 has a flow inlet 9a formed to an upper part thereof being opened in the tangential direction at the inner circumferential surface, and a recovery port 9b for dropping the cuttings or machining chips formed at the bottom of the column.

A discharge end 4b of the pneumatic conveyor 4 is connected to the flow inlet 9a, such that the conveying air stream enters in the tangential direction at the inner circumferential surface of the cylindrical separation column 9 and forms a swirling stream by the energy of the entering stream, centralized air is exhausted through the exhaust cylinder 8 to the outside, and the conveyed cuttings are abutted centrifugally against the circumferential wall of the cylindrical separation column 9 and dropped through the recovery port 9b and then recovered, for example, into a drum can 10 placed just beneath the port.

As shown in FIG. 1, an ejector 6 as a driving source of the pneumatic conveyor 4 comprises a convergent-divergent nozzle 14 in which a throat 13 of a small cross sectional area having an inner diameter of about 2.5 cm is formed between the suction port 11 connected to the conveying pipeline 5 and a discharge port 12. The cross sectional area of the nozzle is gradually contracted from the suction port 11 to the throat 13, and the cross sectional area of a diffuser 18 from the throat 13 to the discharge port 12 is enlarged gradually.

Jet discharge holes 15, 15, - - - for jetting a jet stream by air from the upstream to the downstream of the throat 13 to cause a negative pressure in the nozzle 14 are formed circumferentially each at a predetermined distance to the pipe wall of the convergent-divergent nozzle 14, and pressure control holes 16 passing through the pipe wall of the convergent-divergent nozzle 14 and in communication with atmospheric air are formed at the downstream of the jet blowing holes 15, 15, - - - .

The jet blowing holes 15, 15, - - - are formed each at an acute angle to a stream line F of the conveying air stream flowing in the convergent-divergent nozzle 14 and inner openings 15a, 15a,- - -of the holes are formed each at a predetermined distance along the circumferential direction of the inner circumferential surface. A pressurized air supply source 17 such as plant air is connected with a connection port 15b formed to the outer circumferential surface of the convergent-divergent nozzle 14.

In this embodiment, the pressure control holes 16 are inclined toward the discharge port 12 so as to form an acute angle relative to the stream line F of the conveying air stream, and inner openings 16a thereof are formed along the inner circumferential surface of the diffuser 18 extending from the throat 13 to the discharge port 12 in the shape of a ring or each at a predetermined distance in the circumferential direction thereof, while a plurality of perforations 16b for communicating the openings 16a and external air are formed radially each at an equal distance.

The operation of the present invention having the constitution as described above is to be described.

FIG. 3 is a simulation chart for analyzing the flow speed in the ejector in which FIG. 3(a) shows a flow speed distribution when using the ejector 6 according to the present invention formed with the pressure control holes 16, while FIG. 3(b) shows a flow speed distribution when using an ejector of an identical type but not formed with the pressure control holes. In both of the cases, a pressurized air at 4 kg/cm$^2$ was supplied to the jet blowing holes 15, 15, - - - to jet a jetting stream by air thereby forming a negative pressure in the convergent-divergent nozzle 14 to generate the conveying air stream.

Referring to the flow speed distribution, in the type not formed with the pressure control holes shown in FIG. 3(b), a high speed region H formed by the jet stream jetted from the jet blowing holes 15, 15, - - - disappear immediately after reaching the center of the convergent-divergent nozzle 14 and, accordingly, the length of the high speed region H on the stream line F of the conveying air stream is short.

On the other hand, in the type formed with the pressure control holes 16 shown in FIG. 3(a), it can be seen that the high speed region H formed by the jet stream jetted from the jet blowing holes 15, 15, - - - does not disappear even after reaching the center of the convergent-divergent nozzle 14, and the high speed region H at high speed extends longer along the stream line F of the conveying air stream toward the discharge port 12.

When a jet stream is jetted into the convergent-divergent nozzle 14, a dynamic pressure that involves air from the suction port 11 to form a conveying air stream and a static pressure that tends to inhibit the flow of the conveying air stream exert, to generate a conveying air stream since the dynamic pressure is sufficiently higher than the static pressure. It is considered that the static pressure component tending to inhibit the flow of the conveying stream is caused to escape by the pressure control holes 16 in this embodiment.

Accordingly, formation of the pressure control holes 16 increases the flow speed of the conveying air stream formed in the convergent-divergent nozzle 14 and, as a result, increases the negative pressure of the ejector 6 to increase the ejector power.

As a result of this experiment, the negative pressure at the suction port 11 was −0.06 kg/cm$^2$ in an ejector not formed with the pressure control holes 16, whereas the negative pressure was increased by about five times, that is, to −0.3 kg/cm$^2$ in an ejector 6 formed with the pressure control holes 16.

According to the study of the present inventors, a negative pressure at about −0.2 kg/cm2 is necessary in view of the difference in the difference of height and the entire length of the conveying pipeline 5 as a driving source for the pneumatic conveyor 4 for sucking and conveying metal cuttings or machining chips, so that the ejector 6 according to the present invention can be put to practical use as the driving source for the pneumatic conveyor.

In the fine solids recovery apparatus 1 using the ejector 6 described above, when a pressurized air at 4 kg/cm$^2$ was supplied to the ejector 6 and a jet stream was jetted to the convergent-divergent nozzle 14, it involved air on the suction port 11 of the ejector 6 to generate a conveying air stream in the conveying pipeline 5.

When the suction end 4a of the pneumatic conveyor 4 is placed in the bucket 3 of the machine 2, the metal cuttings or machining chips are sucked, which flow as a solid/gas mixed phase stream comprising air and cuttings or machining chips in admixture by the conveying air stream through the conveying pipeline 5, pass through the ejector 6 and reach the cyclone separator.

Since the ejector 6 is a pipeline formed as the convergent-divergent nozzle 14 extending from the suction port 11 through the throat 13 to the discharge port 12, it has no driving portion as in a mechanical type vacuum pump and, accordingly, it is free from the worry of causing clogging by the cuttings or machining chips which would invite injury or failure.

Then, since the conveying air stream blown out of the discharge port 12 of the ejector 6 and reaching the cyclone separator 7 was blown vigorously into the cylindrical separation column 9 along the tangential direction on the inner circumferential surface thereof, it created a swirling stream flowing downwardly along the circumferential wall.

The swirling stream forced air to the central area and exhausted it from the exhaust cylinder 8 to the outside, and cuttings or machining chips conveyed on the air were centrifugally collided with the circumferential wall of the cylindrical separation column 9, guided to the recovery port 9b and then dropped into drum can 12 placed just below the port.

FIG. 4 shows another ejector according to the present invention. Portions in common with those in FIG. 1 and FIG. 2 carry identical reference numerals, for which detailed explanation will be omitted.

This embodiment is suitable to an ejector 21 having a relatively large inner diameter. Controlling fluid blowing holes 22 for forcing the jet stream to the center of the convergent-divergent nozzle 14 are formed between the jet blowing holes 15, 15, - - - and the pressure control holes 16, each at a jetting angle $\theta_2$ larger than the jetting angle $\theta_1$ for the jet blowing hole 15 relative to the stream line F of the conveying air stream.

Further, the angle of inclination for each of the blowing holes 15, 22 is chosen such that the flow line J for the jet stream jetted from the jet blowing holes 15 and the stream line C for the controlling fluid jetted from the controlling fluid blowing hole 22 intersect to each other on the stream line F of the conveying air stream passing the center of the convergent-divergent nozzle 14.

A regulator 23 is intervened in the pipeline for supplying air to the controlling air discharge port 22, so that the pressure of the supplied controlling air can be controlled.

When the present inventors experimentally manufactured an ejector of a relatively large diameter with an inner diameter of about 5 cm intending to increase the flow rate of the conveying air stream, a higher negative pressure could be obtained by the formation of the pressure control holes 16 than that in the ejector not forming the control holes.

However, since the negative pressure was lowered compared with that of the ejector 6 of a small diameter having an inner diameter of about 2.5 cm shown in FIG. 1, an ejector 21 shown in FIG. 4 was further devised so as to obtain a higher negative pressure.

At first, when the flow in an ejector of a large diameter not formed with the pressure control holes 16 was analyzed, it was found that the jet stream flowed along the pipe wall and the high speed region H did not reach the center of the convergent-divergent nozzle 14 as shown in FIG. 5(b).

Then, it may be considered to increase the jetting angle of the jet stream in accordance with the inner diameter of the convergent-divergent nozzle 14 such that the high speed region H reaches the center of the convergent-divergent nozzle 14. However, the involving force is weakened as the jetting angle is larger and it is weakened abruptly as the angle exceeds 45° and no sufficient negative pressure can be obtained.

Then, discharge holes 22 for controlling air are disposed, so that the controlling air forces the jet stream to the center of the convergent-divergent nozzle 14.

As shown in FIG. 5(a), this caused the high speed region H to reach the center of the convergent-divergent nozzle 14, to increase the flow speed and the flow rate of the conveying air stream and increase the negative pressure ejector 21 to thereby outstandingly increase the ejector power.

In addition, even when the total amount of air for the jet stream and the controlling air is made less than the amount of air of the jet stream in a case not providing the controlling air, a negative pressure at a comparable level can be obtained and, accordingly, the running cost can be reduced further.

Further, even when air pressure of plant air fluctuates or even if there may be an error in view of manufacture, the negative pressure of the ejector 21 can be controlled to maximum by controlling the pressure of the controlling air supplied.

While descriptions have been given for a case of using the ejector 6 as a power source for the pneumatic conveyor 4, the present invention is not restricted only thereto but it may be applicable as a driving source of a fluid conveyor that hydraulically conveys lumps of burnt ashes such as clinkers, liquid wastes in the form of sludges and any other materials.

FIG. 6 is an explanatory view showing a fluid conveyor using the ejector 6 of the type shown in FIG. 1 as a power source.

A fluid conveyor 31 of this embodiment is adapted to convey finely pulverized clinkers (lumps of burnt ashes) from a temporary storage tank (source of conveyance) 32 to the recovery tank (destination of conveyance) 33, in which an ejector 6 is intervened in a conveying pipeline 34 for communicating the tanks 32 and 33 to each other.

A conveying pipeline 34 comprises an upper stream suction pipe 34in extending from the lower portion of the temporary storage tank 32 to the suction port 11 of the ejector 6 and a downstream delivery pipe 34out connected with the discharge port 12.

A jet blowing hole 15 of the ejector 6 is connected with a high pressure supply system 37 for supplying supernatants in the temporary storage tank 32 filtered by a filter 35 at a predetermined pressure by a pump 36.

According to this constitution, since a negative pressure is obtained when water is jetted into the ejector 6 to form a jet stream, the negative pressure forms a conveying water stream that conveys clinkers from the temporary storage tank 32 passing through the blowing pipe 34in—ejector 6—blowing out pipe 34out to the recovery tank 33.

As a result of an experiment, when water was jetted by the pump 36 of the high pressure water supply system 37 at a pressure of 2 to 6 kg/cm$^2$, the negative pressure was at –0.15 to –0.25 kg/cm$^2$ at the suction port of an ejector not formed with the pressure control holes 16, whereas it was increased by about 3 to 4 times, that is, to –0.6 to –0.8 kg/cm$^2$ in the ejector 6 formed with the pressure control holes 16.

In this case, a jet stream was jetted from the high pressure water supply system 37 at a flow rate of 61 to 100 liter/min and the clinkers could be sucked from the suction pipe 34 in at a flow rate equal with or more than the water flow rate.

Further, when compared with a case of using a volute pump as a driving source for the fluid conveyor, the maximum suction stroke or head was about 3 m in the volute pump since gap is present between the vanes and the casing, whereas a suction stroke or head of 8 m was obtained in a case of using the ejector 6 according to the present invention.

Further, the conveying fluid of the fluid conveyor is not restricted to the use of a liquid such as water but the fluid may be air as in the case of the pneumatic conveyor 4 used in the recovery apparatus 1 shown in FIG. 2.

As has been described above, according to the present invention, pressure control holes are formed to the downstream of the jet blowing holes formed to the convergent-divergent nozzle for communicating a pressure space at a level higher than the negative pressure formed by the jet stream and at a level lower than the static pressure of the jet stream and the inside of the convergent-divergent nozzle and, when the jet stream is jetted into the convergent-divergent nozzle, the component for the static pressure of the jet stream tending to inhibit the flow of the suction stream is caused to escape through the pressure controlling holes to increase the negative pressure of the ejector, so that this can provide an excellent effect capable of improving the conveying efficiency, serving to energy saving and decreasing the running cost, for example, in a case of application use as the driving source for the fluid conveyor.

What is claimed is:

1. An ejector comprising a convergent-divergent nozzle having a throat formed between a suction port and a discharge port in which jet blowing holes are formed in the convergent-divergent nozzle for jetting a jet stream from the upstream to the downstream of the throat thereby forming a negative pressure, wherein pressure control holes provide an opening to the downstream of the jet blowing holes to communicate with a pressure space at a pressure level higher than a negative pressure formed by the jet stream and lower than a static pressure of the jet stream and the inside of the convergent-divergent nozzle.

2. An ejector according to claim 1, wherein one or both of the jet blowing holes and the pressure control holes provide an opening to the inner circumferential surface of the convergent-divergent nozzle along the circumferential direction in the shape of a ring or at a predetermined spacing.

3. An ejector according to claim 1, wherein the pressure control holes are in communication with atmospheric air.

4. An ejector according to claim 1, wherein controlling fluid discharge holes are formed between the jet blowing holes and the pressure control holes for forcing the jet stream jetted from the jet blowing holes formed being opened on the inner circumferential surface of the convergent-divergent nozzle along the circumferential direction in the shape of a ring or each at a predetermined distance to the center of the convergent-divergent nozzle, and the jetting angle thereof is chosen to an acute angle relative to the stream line from the suction port to the discharge port, the angle being larger than the jetting angle of the jet blowing hole.

5. A fine solids recovery apparatus for sucking and conveying fine solids by a pneumatic conveyor and recovering the fine solids, the recovery apparatus comprising
an ejector along a conveying pipeline of the pneumatic conveyor, the ejector being configured to provide a conveying air stream,
a cyclone separator configured to convey the conveying air stream flowing from the pneumatic conveyor into a cylindrical separation column, thereby forming a swirling stream by an energy thereof, exhausting air drawn to a center of the swirling stream, and recovering fine solids that centrifugally centriugally collides with a circumferential wall, and
the ejector comprising a convergent-divergent nozzle having a throat between a suction port and a discharge port, jet blowing holes being provided in the convergent-divergent nozzle for jetting a jet stream from the upstream to the downstream of the throat thereby forming a negative pressure, pressure control holes providing an opening downstream of the jet blowing holes to communicate with a pressure space at a pressure level higher than a negative pressure formed by the jet stream and lower than a static pressure of the jet stream and the inside of the convergent-divergent nozzle.

6. A fluid conveyor for conveying material to be conveyed together with a conveying fluid through a pipe, the fluid conveyor comprising
an ejector provided along a conveying pipeline that extends from conveyance source to the conveyance destination, said ejector configured to form and to convey a conveying stream to the conveyance destination,
the ejector comprising a convergent-divergent nozzle having a throat between a suction port and a discharge port, jet blowing holes being provided in the convergent-divergent nozzle for jetting a jet stream from the upstream to the downstream of the throat thereby forming a negative pressure, pressure control holes providing an opening to downstream of the jet blowing holes to communicate with a pressure space at a pressure level higher than a negative pressure formed by the jet stream and lower than a static pressure of the jet stream and the inside of the convergent-divergent nozzle.

7. An ejector according to claim 2, wherein the pressure control holes are in communication with atmospheric air.

8. An ejector according to claim 2, wherein controlling fluid discharge holes are formed between the jet blowing holes and the pressure control holes for forcing the jet stream jetted from the jet blowing holes formed being opened on the inner circumferential surface of the convergent-divergent nozzle along the circumferential direction in the shape of a ring or each at a predetermined distance to the center of the convergent-divergent nozzle, and the jetting angle thereof is chosen to an acute angle relative to the stream line from the suction port to the discharge port, the angle being larger than the jetting angle of the jet blowing hole.

9. An ejector according to claim 3, wherein controlling fluid discharge holes are formed between the jet blowing holes and the pressure control holes for forcing the jet stream jetted from the jet blowing holes formed being opened on the inner circumferential surface of the convergent-divergent nozzle along the circumferential direction in the shape of a ring or each at a predetermined distance to the center of the convergent-divergent nozzle, and the jetting angle thereof is chosen to an acute angle relative to the stream line from the suction port to the discharge port, the angle being larger than the jetting angle of the jet blowing hole.

10. An ejector according to claim 7, wherein controlling fluid discharge holes are formed between the jet blowing holes and the pressure control holes for forcing the jet stream jetted from the jet blowing holes formed being opened on the inner circumferential surface of the convergent-divergent nozzle along the circumferential direction in the shape of a ring or each at a predetermined distance to the center of the convergent-divergent nozzle, and the jetting angle thereof is chosen to an acute angle relative to the stream line from the suction port to the discharge port, the angle being larger than the jetting angle of the jet blowing hole.

* * * * *

UNITED STATES PATENT AND TRADEMARK OFFICE
CERTIFICATE OF CORRECTION

| | | |
|---|---|---|
| PATENT NO. | : 6,974,279 B2 | Page 1 of 1 |
| APPLICATION NO. | : 10/679352 | |
| DATED | : December 13, 2005 | |
| INVENTOR(S) | : Y. Morohashi et al. | |

It is certified that error appears in the above-identified patent and that said Letters Patent is hereby corrected as shown below:

At column 9, line 56 (claim 5, line 12) of the printed patent, delete "centriugally".

Signed and Sealed this

Eighth Day of August, 2006

JON W. DUDAS
*Director of the United States Patent and Trademark Office*